(No Model.) 2 Sheets—Sheet 2.

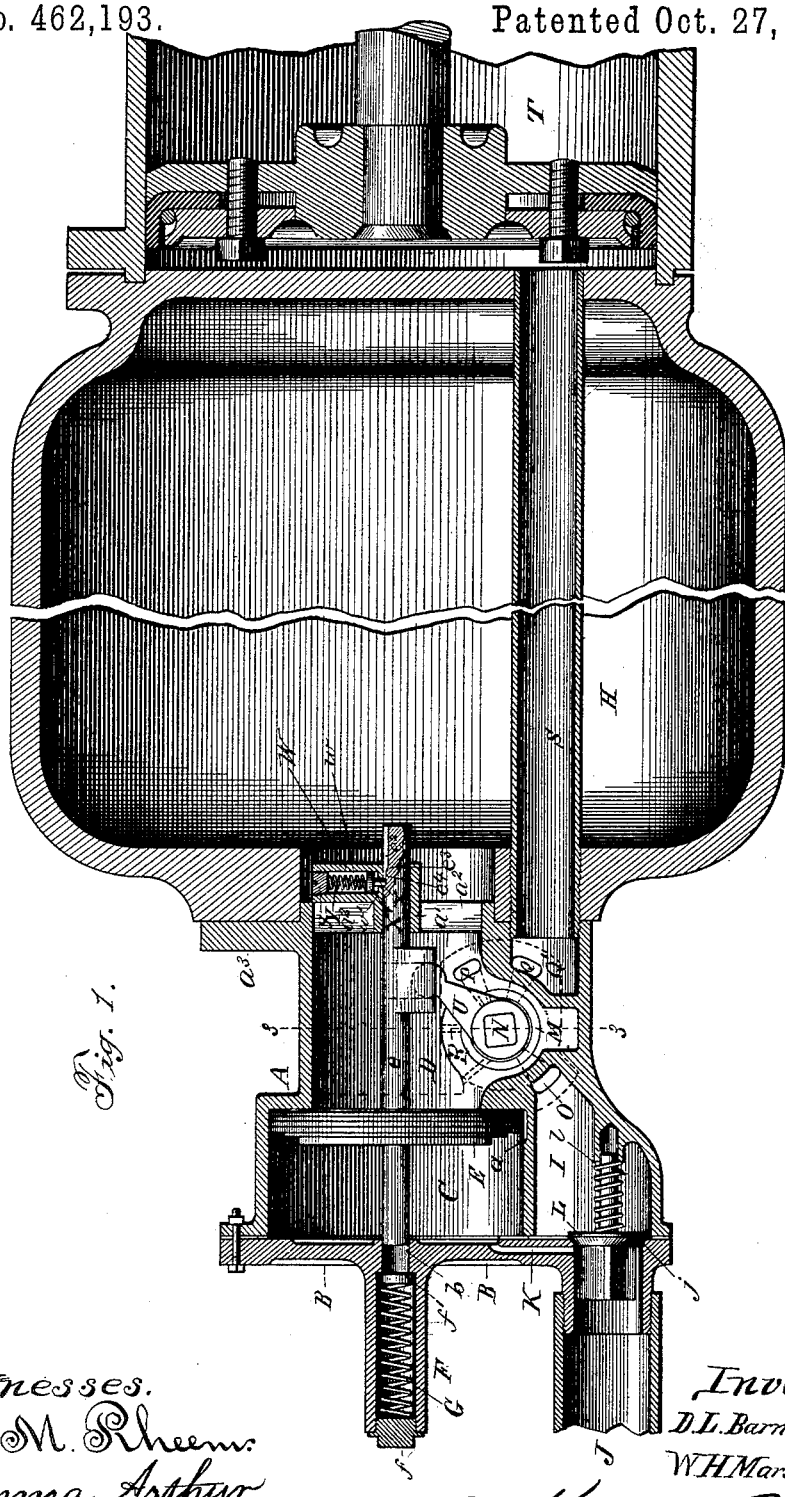

D. L. BARNES & W. H. MARSHALL.
AIR BRAKE.

No. 462,193. Patented Oct. 27, 1891.

Witnesses.
Wm M. Rheem
Emma Arthur

Inventors
D. L. Barnes
W. H. Marshall,
By Knight Bros
Atty's

UNITED STATES PATENT OFFICE.

DAVID L. BARNES AND WALDO H. MARSHALL, OF CHICAGO, ILLINOIS, ASSIGNORS TO THE LANSBERG BRAKE COMPANY, OF ST. LOUIS, MISSOURI.

AIR-BRAKE.

SPECIFICATION forming part of Letters Patent No. 462,193, dated October 27, 1891.

Application filed July 22, 1890. Serial No. 359,519. (No model.)

*To all whom it may concern:*

Be it known that we, DAVID L. BARNES and WALDO H. MARSHALL, citizens of the United States, residing at Chicago, in the county of Cook and State of Illinois, have invented certain new and useful Improvements in Air-Brakes, of which the following is such a full, clear, and exact description as will enable those skilled in the art to make, construct, and use the same.

The invention consists in certain features of novelty that are particularly pointed out in the claims hereinafter, said invention being first fully described with reference to the accompanying drawings, which form a part of this specification, and in which—

Figure 3:
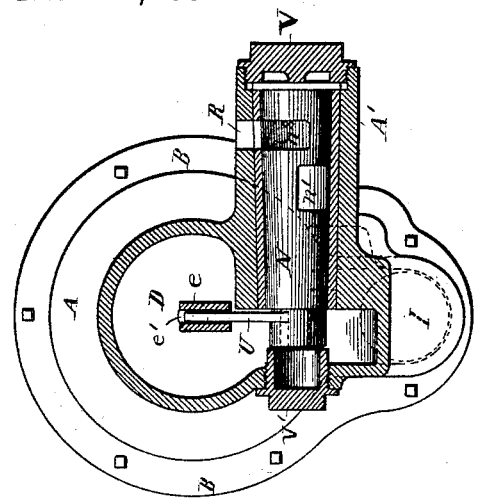
Figure 6:
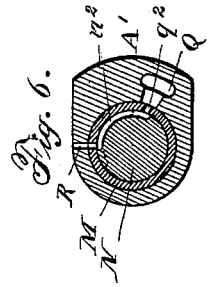
Figure 9:
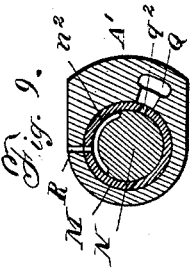
Figure 5:
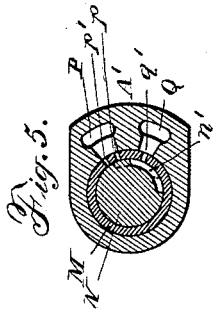
Figure 8:
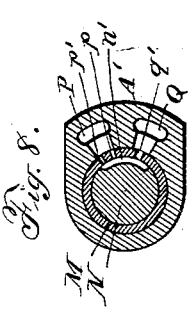
Figure 2:
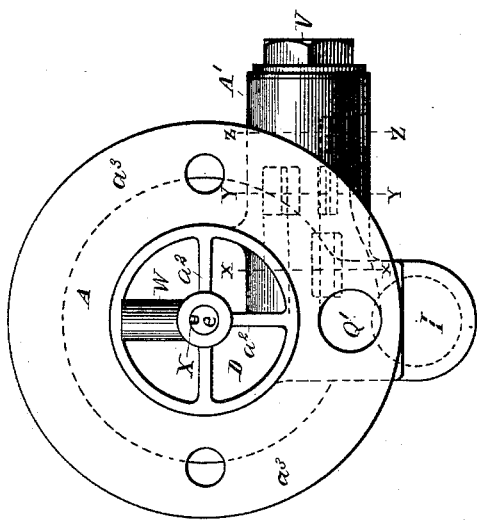
Figure 4:
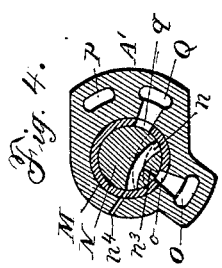
Figure 7:
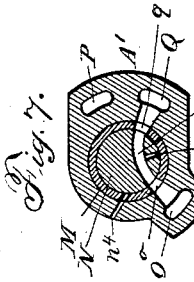

Figure 1 is an axial section of the brake-cylinder, the auxiliary reservoir, and the triple valve of an air-brake embodying the invention. Fig. 2 is an elevation of the triple valve viewed from the end that joins the auxiliary reservoir. Fig. 3 is a transverse section of said valve, the plane of the section being indicated by the line 3 3, Fig. 1. Figs. 4, 5, and 6 are sections on the lines X, Y, and Z, respectively, Fig. 2, the full lines showing the plug-valve in the position it occupies while the parts are in their normal positions and the brakes off, and the dotted lines showing the valve in the position it occupies in applying the brakes for a service stop. Figs. 7, 8, and 9 are sections on the lines X, Y, and Z, respectively, showing the valve in the position it occupies in applying the brakes for an emergency stop.

The triple-valve casing may be constructed in any suitable manner, but is preferably made in two cast-brass parts—a hollow shell A and a cap or head B for closing one end thereof, both of which have certain features that will be described in due course. The shell A has an opening C D extending through it from end to end, the portion C being bored cylindrical for the reception of a suitably-packed piston E, by which all communication between said cylinder C and chamber D is cut off, save while the piston occupies the position shown in the drawings. When in this position air can pass from C to D through a small groove $a$, cut in the surface of the cylinder. The rod $e$ of the piston is guided at one end by a bearing $a'$, supported by straddle-arms $a^2$, cast with the shell A, and at the other end by the head B, which has an eye $b$, into which the end of the rod projects.

F is a tubular projection extending outward from the head B, the bore of which is concentric with but somewhat larger than the eye $b$, so as to form a shoulder or offset. This hollow projection constitutes the casing for the coiled graduating-spring G, which is confined by a screw-cap $f$, between which and a follower $f'$ it may be compressed to any required initial tension.

The end of the casting A remote from head B is provided with a flange $a^3$, perforated for the reception of bolts, whereby it is secured to one end of the auxiliary reservoir H, so that the interior of the latter shall be constantly in direct communication with the chamber D.

I is a chamber, with which the train-pipe J communicates through an opening or port surrounded by a valve-seat $j$, and K is a port formed in the head B and through which the train-pipe communicates with the cylinder C.

L is a check-valve situated within the chamber I and closing outward against the seat $j$, and $l$ is a light spiral spring which bears against the valve and insures its reseating.

Projecting outward from the casting A is an arm A', having an outwardly-flaring central bore extending from the chamber C to its extremity. Within this bore is fitted a correspondingly-flaring bushing M, which forms the socket for the frusto-conical plug-valve N.

O is a port that communicates with the chamber I at one end, whence it extends outward along the arm A' for a short distance and communicates with the socket of valve N through a port $o$.

P is a port that communicates at one end with the chamber D, whence it extends outward along the arm A' to a point a little beyond the port $o$ and communicates with the socket of valve N through two ports $p$ and $p'$, situated some distance apart, and Q is a port that extends nearly the whole length of the arm A' and is enlarged at its inner end, so as to form a chamber Q'. It communicates with the socket of the valve N through three separate ports, the first $q$ situated in the same plane as the port $o$, the second $q'$ situated in the same plane as are the ports $p$ and $p'$, and the third $q^2$ situated beyond these latter ports and in the same plane as is the exhaust-port R, which opens to the atmosphere.

S is a pipe which communicates at one end with the chamber Q' and at the other end with the brake-cylinder T, in which works a piston for operating the brake connections in the usual manner.

The valve N is provided with three passage-ways, one $n$ situated in the plane of the ports $o$ and $q$, a second $n'$ situated in the plane of the ports $p$, $p'$, and $q'$, and the third $n^2$ situated in the plane of the ports $q^2$ and R.

U is a lever, one end of which is provided with a square eye for the reception of the squared end of the valve N, while the other end projects into a slot $e'$ in the rod $e$.

A screw-plug V closes the outer end of the valve-socket and bears against the outer end of the valve for holding it snugly in place, and a similar plug V' closes an opening through the side wall of the casing opposite the inner end of the socket and holds the lever U in place.

The operation is as follows: It will be understood that on each car of the train is placed a brake-cylinder T, the piston of which is suitably connected with the brake-beams, an auxiliary reservoir H, and a triple valve, and that compressed air is supplied to these appliances on all of the cars through a train-pipe J from a main reservoir situated usually on the engine. The full lines of Figs. 1 to 6 of the drawings show the parts in their normal positions. When compressed air is admitted to the train-pipe, it flows through port K into cylinder C, thence through groove $a$ into chamber D, and thence into the auxiliary reservoir H until the pressure in all of these parts is equalized, in which condition the brakes remain off. To apply the brakes, the engineer permits more or less air to escape from the train-pipe, thereby reducing the pressure therein. As there is a constant tendency to the equalization of pressure throughout the entire system, any reduction of pressure in the train-pipe will cause a corresponding reduction of pressure in the cylinder C, the air flowing from C through K and into J until equilibrium is restored. As the port K is of greater capacity than the groove $a$, the air will flow from C to J faster than it can flow from D to C, and the result is an inequality of pressure on opposite sides of the piston E, with the excess on the side of the chamber D. This causes the piston to traverse the cylinder a greater or less distance and at a greater or less speed, according to the extent of the reduction of the pressure in the train-pipe and the rapidity with which such reduction took place. For service stops the reduction will be slight—say ten pounds—and very gradual, though faster than can be equalized through groove $a$, so that the piston traverses its cylinder, say, half an inch. This will carry it far enough to close the groove $a$, thereby cutting off communication between C and D and bring the end of the rod $e$ into contact with the follower $f$. This turns the valve N in the direction of the arrow from the position shown by full lines in Figs. 1 to 6 to that shown by dotted lines in Figs. 4, 5, and 6. In this position the valve cuts off communication between ports $q^2$ and R and establishes communication between $p$ and $q'$. Air then flows from the auxiliary reservoir into chamber D, thence through ports P and $p$, passage-way $n'$, ports $q'$ and Q, chamber Q', and pipe S into the brake-cylinder T and applies the brakes. The flow of air continues until the pressures in the train-pipe and auxiliary reservoir are equalized, whereupon the piston is returned far enough to close the passage between the auxiliary reservoir and brake-cylinder, but not far enough to establish communication between the cylinder and exhaust-port. To release the brakes the air in the train-pipe is again brought to a higher pressure than the air in the chamber D and auxiliary reservoir H, causing the piston and other parts to move back to their normal positions, cutting off communication between ports $p$ and $q'$ and establishing communication between the port $q^2$ and the exhaust-port R. The compressed air then exhausts from the brake-cylinder through pipe S, chamber Q', ports Q and $q^2$, passage $n^2$, and port R, and the piston in said cylinder is restored to normal position by a spring in customary manner. For an emergency stop the pressure in the train-pipe is reduced more suddenly and to a greater extent. The result is that the piston E moves more quickly and farther than above described, and as a consequence the valve N is turned farther—say to the position shown by Figs. 7, 8, and 9. In this position the port $q'$ is in communication with both of the ports $p$ and $p'$, and consequently the flow of air from the auxiliary reservoir to the cylinder through port $q'$ will be more rapid, resulting in a quicker application of the brakes; but the quick application is due not so much to this increase in the capacity of the passage leading from the auxiliary reservoir to the cylinder as it is to the fact that the whole of the compressed air in the train-pipe is instantly admitted to the brake-cylinder. This is due to the fact that the far movement of the valve N causes it to put the ports $o$ and $q$ in communication through the passage $n$, and the pressure in the train-pipe being greatly in excess of that in the passage between it and the brake-cylinder the check-valve L will be unseated and the air from the train-pipe will rush into the brake-cylinder through chamber I, ports O and $o$, passage-way $n$, ports $q$ and Q, and pipe S, applying the brakes. This sudden reduction of pressure in the train-pipe on one car causes a similar action to take place on the next car, and so on in very rapid succession to the end of the train. When the air-pressure against the outer face of valve L is no longer in excess of the air-pressure against the back of said valve, the spring $l$ will reseat it, so that air cannot pass from the chamber I back into the train-pipe.

As a substitute for the groove $a$, or as a means auxiliary thereto for filling the auxiliary reservoir, the valve N may be provided with a passage $n^3$, so situated as to connect the port $o$ with the passage $n$, and the bushing and valve-casing provided with a port $n^4$, so situated as to connect the said passage $n$ with the chamber D when the valve is in its normal position, as shown by full lines in Figs. 4, 5, and 6. With this arrangement, when there is a greater pressure in the train-pipe than there is in the auxiliary reservoir, the air will unseat valve L and flow to the said reservoir through chamber I, ports O and $o$, passages $n^3$ and $n$, and port $n^4$.

When the brakes have been applied for a service stop and the pressure in the auxiliary reservoir and train-pipe has become equalized, a slight pulsation of air in the train-pipe might return the piston E to its normal position and thereby cause a premature release of the brakes. In order to avoid such a movement of the piston, we provide a device, such as shown in Fig. 1, for applying a slight friction to the rod $e$. Upon one of the arms $a^2$ is an enlargement W, which is provided with a bore $w$, extending radially with respect to the rod $e$, the inner end of said bore being contracted, so as to form an offset or shoulder $w'$. Within this bore is placed a follower having a reduced portion X, that passes through the contracted portion of the bore $w$, and a head X', which occupies the larger portion of said bore and at times rests upon the shoulder $w'$. A spring Y, situated in the bore $w$ and confined by a screw-cap $y$, bears against the follower and forces it toward the rod $e$. The rod is provided with a groove of unequal depth, into which the end X of the follower projects. While the brakes are applied the follower occupies the cut-away portion $e^2$ or deep end of the groove, which is of such depth that the head X' of the follower will rest upon the shoulder $w'$, and the portion X will thereby be held out of contact with the rod. When once applied they cannot be released unless sufficient force is exerted upon the piston to cause it to overcome the friction that will be exerted upon its rod as soon as the incline $e^3$, which unites the two portions $e^2$ and $e^4$ of the groove, comes in contact with the end X of the follower. While the brakes are off the end X of the follower occupies the shallower portion $e^4$ of the groove and produces sufficient friction upon the rod $e$ to prevent any accidental application of the brakes.

A flexible diaphragm may be substituted for the piston E, and any of the other well-known means may be employed for transmitting motion from the rod $e$ to the valve without departing from the spirit of our invention.

What we claim as new, and desire to secure by Letters Patent, is—

1. In an air-brake, the combination of a train-pipe, a piston operated by the variations in the pressure of air in said pipe, an auxiliary reservoir, an air-passage connecting the train-pipe and auxiliary reservoir, a brake-cylinder, an air-passage connecting the train-pipe and brake-cylinder, and a single valve operated by the movement of the piston for controlling the flow of air through both of said passages, said valve closing one of said passages while the other is open, substantially as set forth.

2. In an air-brake, the combination of the train-pipe, a piston operated by the variations in the pressure of the air in said pipe, an auxiliary reservoir, an air-passage connecting the train-pipe and auxiliary reservoir, a brake-cylinder, an air-passage connecting the auxiliary reservoir and brake-cylinder, an air-passage connecting the train-pipe and brake-cylinder, and a plug-valve operated by the piston for controlling the passage connecting the auxiliary reservoir and brake-cylinder and also the passage connecting the train-pipe and brake-cylinder, said valve being adapted to close both of said passages, or close the latter and open the former, or open both, substantially as set forth.

3. In an air-brake, the combination, with the train-pipe, of a piston operated by variations in the pressure of air in said pipe, an auxiliary reservoir, an air-passage connecting the train-pipe and auxiliary reservoir, a brake-cylinder, an air-passage connecting the auxiliary reservoir and brake-cylinder, an air-passage connecting the train-pipe and brake-cylinder, an exhaust-port, and a single valve operated by the piston and adapted to close the passages connecting the brake-cylinder with the train-pipe and auxiliary reservoir and open the brake-cylinder to exhaust, or to close the passages connecting the brake-cylinder with the train-pipe and exhaust and open the passage connecting the auxiliary reservoir and brake-cylinder, or close the exhaust and open the passages connecting the brake-cylinder with the auxiliary reservoir and with the train-pipe, according to its position, substantially as set forth.

4. In an air-brake, the combination of a train-pipe, a piston operated by the variations in the pressure in said pipe, an auxiliary reservoir, a brake-cylinder, an air-passage connecting the train-pipe and auxiliary reservoir, a second air-passage connecting the auxiliary reservoir and brake-cylinder, a third air-passage connecting the train-pipe and brake-cylinder, and a valve operated by the piston for controlling the flow of air through all three of said passages, said valve being adapted to close the second and third and open the first, or close the first and third and open the second, or close the first and open the second and third, according to the extent of the movement, substantially as set forth.

5. In an air-brake, the combination of a train-pipe, a piston operated by the variations in the pressure of air in said pipe, an auxiliary reservoir, an air-passage connecting the train-pipe and auxiliary reservoir, a brake-cylinder, an air-passage connecting the auxiliary reservoir and brake-cylinder, an air-passage connecting the brake-cylinder and train-pipe, an exhaust-port, and a single plug-valve operated by the piston for controlling the flow of air through all of said passages and also the exhaust, substantially as set forth.

6. In an air-brake, the combination of the train-pipe, a piston operated by the variations in the pressure of air in said pipe, an auxiliary reservoir, an air-passage connecting the train-pipe and auxiliary reservoir, a brake-cylinder, an air-passage connecting the auxiliary reservoir and brake-cylinder and having the two ports $p$ and $p'$ situated some distance apart, and a valve operated by the piston and controlling the flow of air through said passage, said valve being adapted to close said passage entirely or open one or both of its ports $p$ and $p'$, substantially as set forth.

7. In an air-brake, the combination of the train-pipe, a piston operated by the variations in the pressure of the air in said pipe, an auxiliary reservoir, an air-passage connecting the train-pipe and auxiliary reservoir, a brake-cylinder, an air-passage connecting said auxiliary reservoir and brake-cylinder and having the service-stop port $p$ and the emergency-stop port $p'$, an air-passage connecting the train-pipe and brake-cylinder, and a valve operated by the piston and adapted to open port $p$ for service stops, and to open both of the ports $p$ and $p'$ and also the passage connecting the train-pipe and brake-cylinder for emergency stops, substantially as set forth.

8. In an air-brake, the combination, with a train-pipe, the auxiliary reservoir, and a brake-cylinder, of a piston operated by variations in the pressure of air in the train-pipe, a chamber D, with which the auxiliary reservoir communicates, chamber I, with which the train-pipe communicates, having valve L, a chamber Q', with which the brake-cylinder communicates, a valve-socket with which all of said chambers communicate, and a valve operated by the piston occupying said socket and adapted to connect chamber Q' with chamber D or with both of the chambers D and I, according to the extent of its movements, substantially as set forth.

9. In an air-brake, the combination, with the train-pipe, the auxiliary reservoir, and a brake-cylinder, of a piston operated by variations in the pressure of air in the train-pipe, a chamber D, with which the auxiliary reservoir communicates, a chamber I, with which the train-pipe communicates, a chamber Q', with which the brake-cylinder communicates, a valve-socket with which all of said chambers communicate, an exhaust-port communicating with said socket, and a valve operated by the piston and occupying said socket and adapted to connect chamber Q' with the exhaust or with chamber D, or with both of the chambers D and I, substantially as set forth.

10. In an air-brake, the combination, with the train-pipe, auxiliary reservoir, and brake-cylinder, of a piston actuated by variations in the pressure of the air in the train-pipe, chamber D, communicating with the auxiliary reservoir, chamber I, communicating with the train-pipe, chamber Q', communicating with the brake-cylinder, the valve-socket port $n^4$, and ports P and $p$, connecting chamber D with said socket, ports Q and $q'$, connecting chamber Q' with said socket, ports O and $o$, connecting chamber I with said socket, and the valve N, operated by the piston, occupying said socket, and having passage-way $n'$ for connecting ports $p$ and $q'$ and passage-way $n$ and $n^3$ for connecting ports $o$ and $n^4$, substantially as set forth.

11. In an air-brake, the combination, with the train-pipe, the auxiliary reservoir, and the brake-cylinder, of a piston actuated by the variations in the pressure of the air in the train-pipe, the chamber D, communicating with the auxiliary reservoir, the chamber I, communicating with the train-pipe, the chamber Q', communicating with the brake-cylinder, the valve-socket, the ports P and $p$, connecting the chamber D with said socket, the ports O and $o$, connecting chamber I with said socket, the port Q, communicating with chamber Q' and also with said socket through ports $q$ and $q'$, and the valve operated by the piston occupying said socket and having the passage-way $n$ for connecting ports $o$ and $q$ and passage-way $n'$ for connecting ports $p$ and $q'$, substantially as set forth.

12. In an air-brake, the combination of the shell A, the radial arms $a^2$, extending across said shell, and one of said arms having the enlargement W, provided with the bore $w$, the triple valve having its stem passing the end of said bore and being provided with an inclined friction-surface, and a spring-stop arranged in said bore and adapted to engage said friction-surface, substantially as set forth.

Signed at Chicago this 11th day of July, A. D. 1890.

DAVID L. BARNES.
WALDO H. MARSHALL.

In presence of—
C. F. THOMPSON, Jr.,
GEORGIA BURKE.